Jan. 21, 1936.  J. ROME ET AL  2,028,476
GARAGE FOR AUTOMOBILES AND THE LIKE
Filed May 2, 1933   6 Sheets-Sheet 1

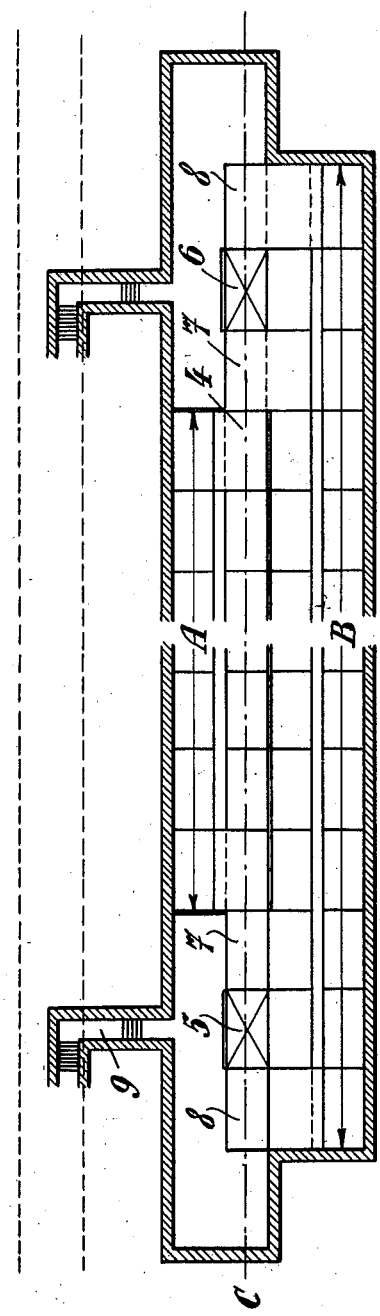
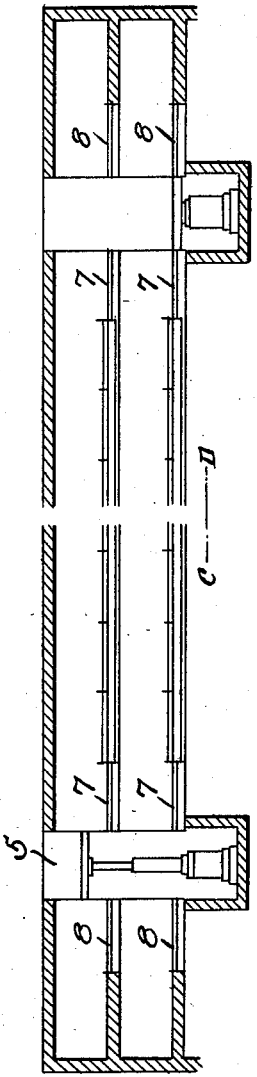

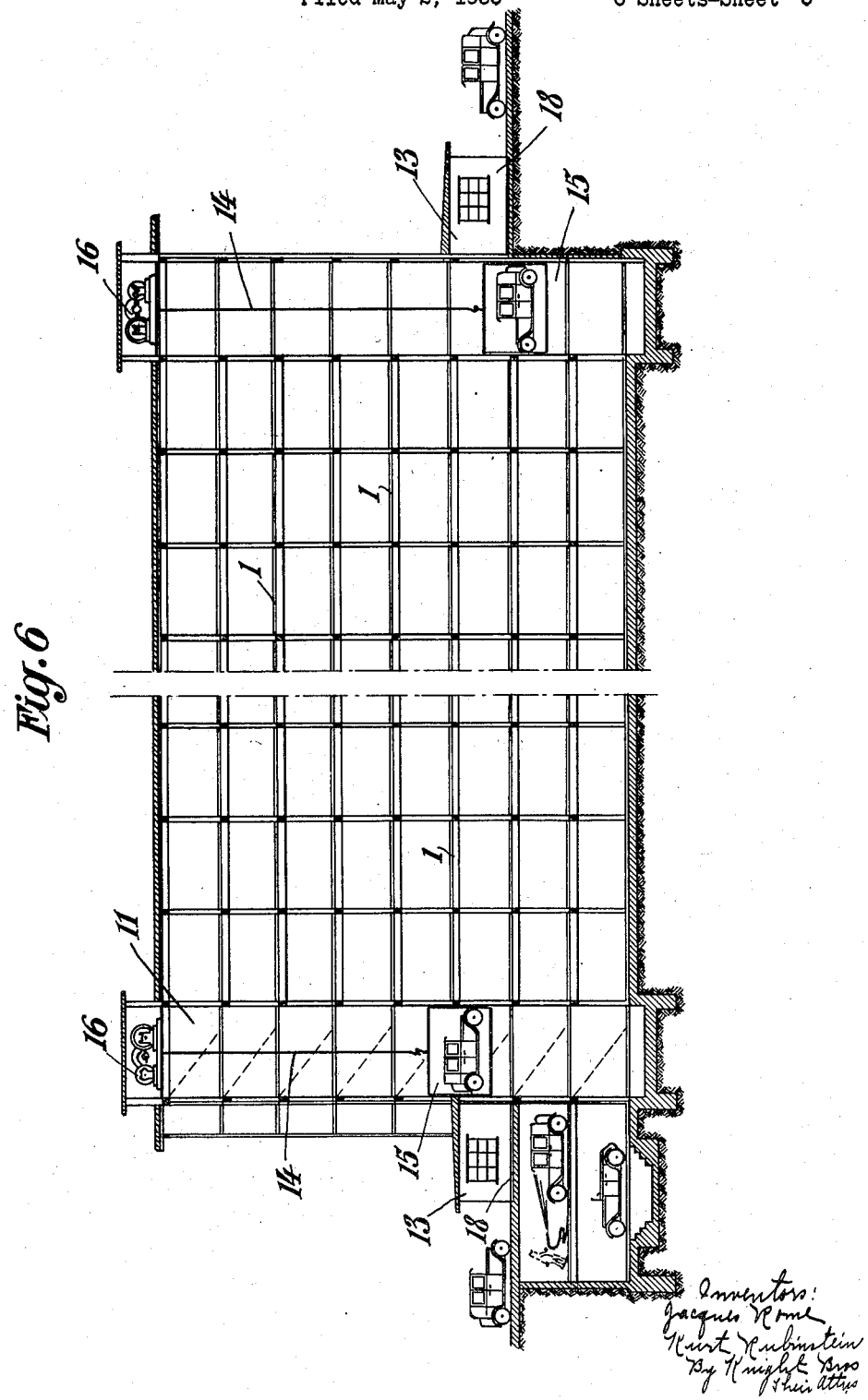

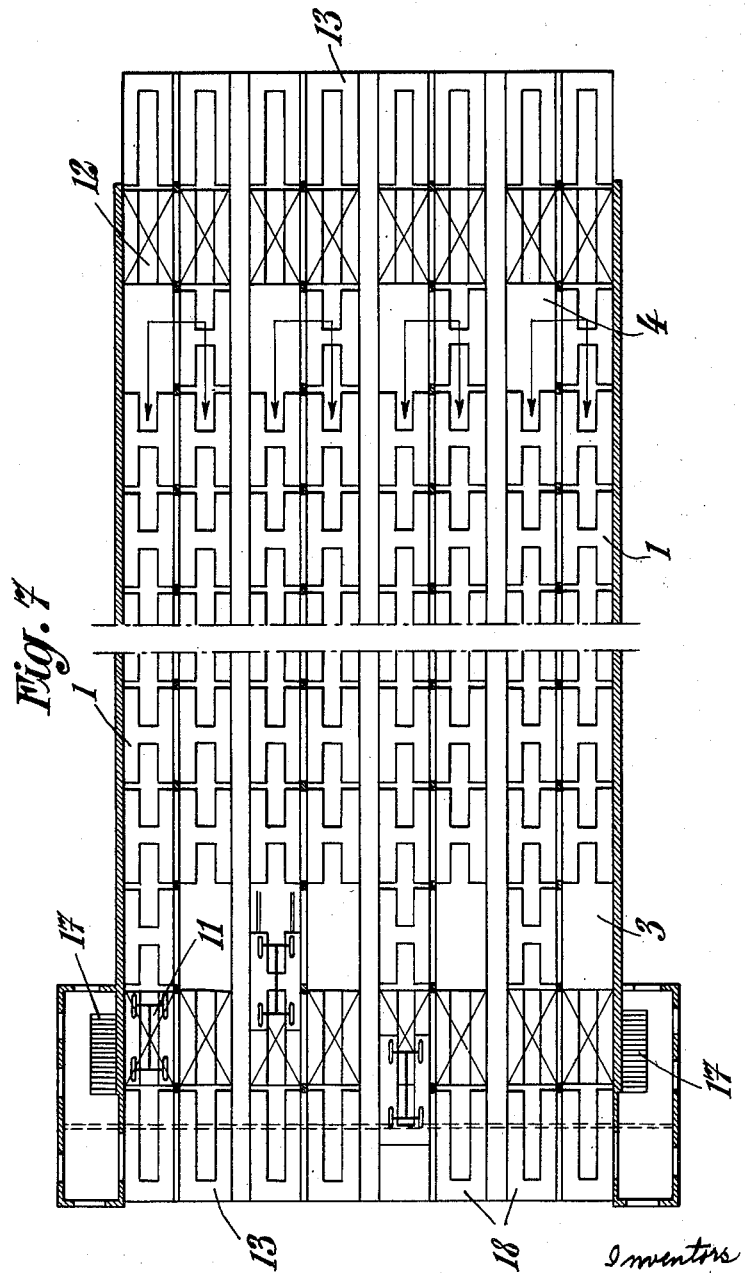

Jan. 21, 1936. J. ROME ET AL 2,028,476
GARAGE FOR AUTOMOBILES AND THE LIKE
Filed May 2, 1933 6 Sheets-Sheet 5
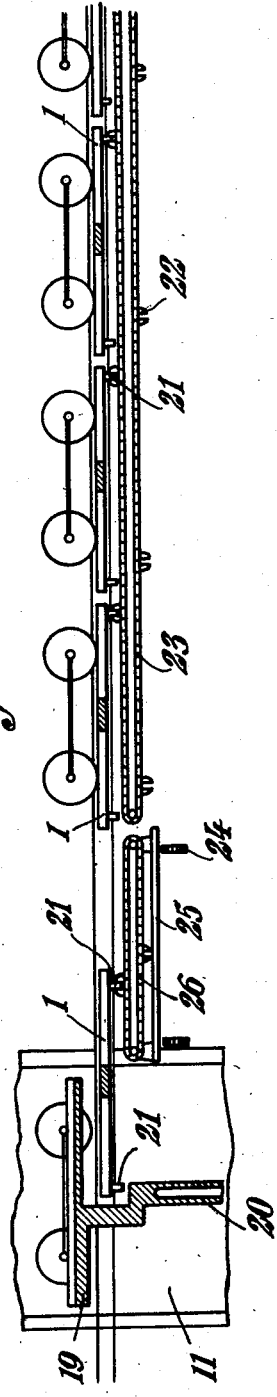
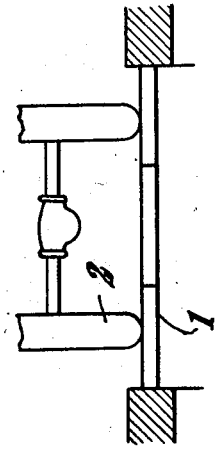
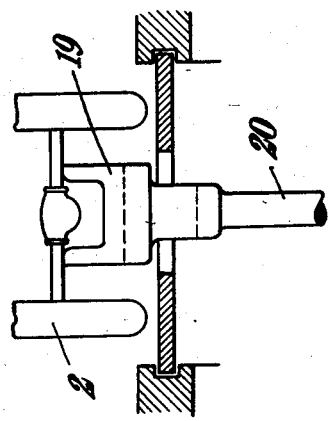

Jan. 21, 1936.  J. ROME ET AL  2,028,476
GARAGE FOR AUTOMOBILES AND THE LIKE
Filed May 2, 1933   6 Sheets-Sheet 6

Patented Jan. 21, 1936

2,028,476

UNITED STATES PATENT OFFICE 2,028,476

GARAGE FOR AUTOMOBILES AND THE LIKE

Jacques Rome and Kurt Rubinstein, Paris, France

Application May 2, 1933, Serial No. 669,029
In Austria March 21, 1932

4 Claims. (Cl. 214—16.1)

This invention relates to garages for automobiles and the like, more particularly of the closely-storing type with mechanical equipment for the conveyance and parking of the vehicles housed therein. Garages having platforms as stands for the vehicles which are movable in closed horizontal loop formation are notable for their simplicity of arrangement and general ready accessibility, even when a plurality of such loops of platforms are disposed one above the other.

The present invention has for its object in the first place to ensure the fullest possible utilization of the floor area of the garage for actual standing room, and, in the second place, to permit of the fullest possible mechanization of the conveyance of the vehicles within the lay-out of the garage, in order to ensure rapid parking and discharge in spite of restrictions in the matter of space. In cases in which a plurality of such loops are provided in a multi-storied building one above the other, these loops are brought into intercommunication with each other by means of lifts. The driving of the platforms about their loop-shaped paths, of the lifts, and of the other conveyor elements employed can be effected electrically, hydraulically, or pneumatically, in any desired manner. The transference of the vehicles between the lift and the platforms or the place of admission from the roadway is effected, in accordance with the invention, by the arrangement that the platforms or the bed plates of the entrances are slid out towards the well of the lift. The stand plate or platform can be adapted to be slidable, if desired, in its entirety from the loop into the lift, and to be conveyed in this latter right up to the roadway where it is either charged with a fresh vehicle or conveyed back empty by the lift into its place in the loop. It will be clear that in the case of smaller plants without completely automatic operation this transference of the vehicles can also be effected with the aid of the latter's own power.

The construction according to the invention permits, for example, of the building of a garage under the paving even of a narrow street, and of using the opening of a lift well as an entrance. The garage can thus be used in cities with very dense traffic and narrow streets, for the temporary storage or parking of cars.

Several constructional forms of the invention are shown, by way of example, in the accompanying drawings, in which:—

Figs. 4 and 5 show the lay-out for a two-storied garage under a road surface, in vertical section and in plan, respectively.

Figs. 6 and 7 show a multi-storied large scale garage, in vertical section and in section through the ground floor, respectively.

Figs. 8 and 9 show in plan view and in vertical section, respectively, on an enlarged scale, the drive for the movable stands, and the construction of the vertically and horizontally movable supporting platforms.

Figs. 10 and 11 show diagrammatically, in vertical section, the co-operation of these supporting platforms.

Figure 1:
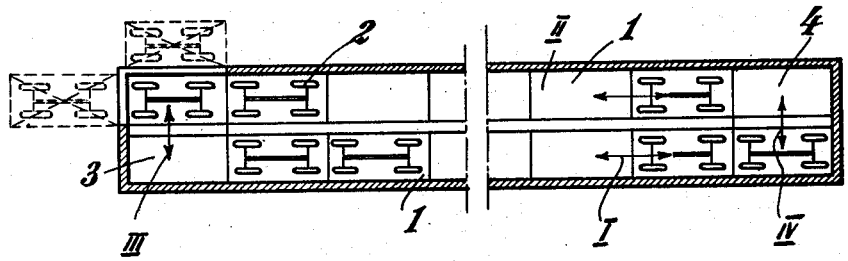
Figs. 1 to 3 show various ground plans for a single-storied form of construction of garage in accordance with the invention.
Figure 2:
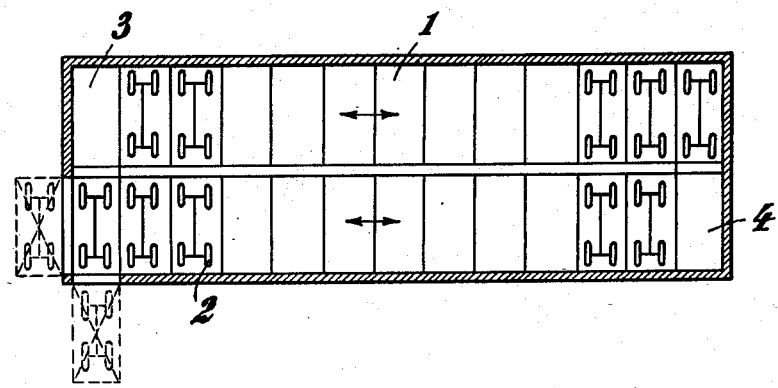
Figure 3:
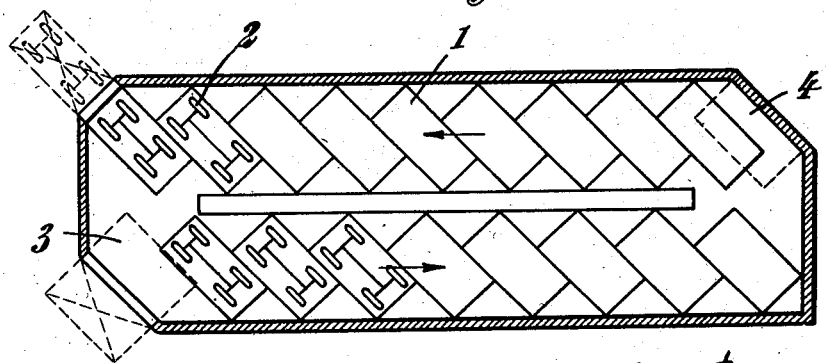
Figure 12:
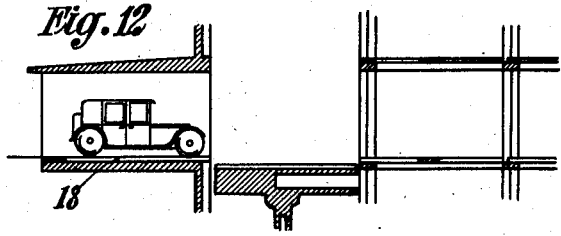
Figs. 12 to 23 show in pairs of sections taken at right angles to each other, the individual phases of the mechanical bringing of the vehicles into position.
Figure 13:
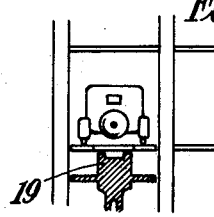
Figure 14:
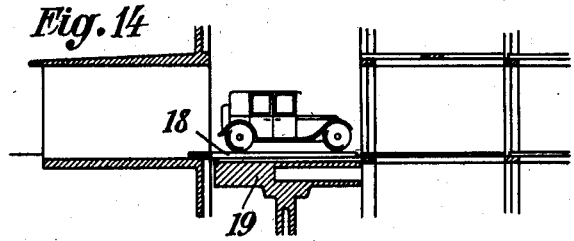
Figure 15:
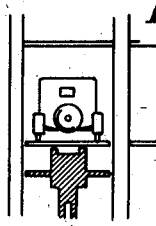

Referring to the drawings, the ground plan solutions illustrated in Figs. 1 to 3 are equally applicable to single-storied and to multi-storied lay-outs. In the longitudinal building there are two rows of platforms 1 representing the stands for the automobiles or the like 2, so mounted, for example on rails, that they are capable of moving in closed and narrow loop formation. The drive is effected preferably by means of four belts for the two longitudinal and transverse movements. In the form shown in Fig. 1 the platforms are arranged end to end, in that shown in Fig. 2 side by side, and in that shown in Fig. 3 in oblique juxtaposition. The entry and exit doors are preferably situated at the points at which the reversal of the movement of the platforms takes place.

At these points the platforms can be outwardly slidable, and that either in the direction of their longitudinal or of their transverse axis. The thrust-out positions are indicated in broken lines in Figs. 1 to 3. The thrusting out is effected, for example, likewise by means of endless belts, as will be described later with reference to Figs. 8 and 9.

When it is desired to bring a car into the garage the loop is moved until an unoccupied platform is brought opposite the door. If the platforms be not arranged to slide out, the car is driven under its own power on to the platform, after which the movement of the entire series of platforms in loop formation is resumed. When slidable platforms are used the car is driven on to the platform while the latter is in the protruded position, to be transferred with the same into its place in the loop within the garage. On driving out, the same procedure is repeated in the reverse order, for which reason in the description given of the further forms of construction mention is made only of the driving-in, in each case.

The movement of the loop must proceed intermittently in the forms of construction shown in Figs. 1 and 2. A further stipulation is that at the ends of the loop there shall only be one platform at a time, so that there is always a space 3 (4) free at these points for the transverse displacement of the end platform. In the form of construction shown in Fig. 3 the movement of the loop is continuous, in order to permit of the platforms passing each other at the ends. With the lay-outs shown in Figs. 1 and 2 the movement of the loop is also reversible.

In the case of a garage (Figs. 4 and 5) situated beneath street paving 10, this garage being in the present instance two-storied, there are two adjacent loops on each story. This lay-out, which is intended to serve mainly for temporary parking purposes, is based on the principle of reducing the time required for driving in and driving out at the street level to a minimum. Provision is therefore made for the car to pass in and out with the engine running.

The two loops A and B are of different lengths. In the re-entrant corners of the spaces occupied by the loops there are arranged the lift wells or pits 5, 6. These wells are disposed directly adjacent to the last stand but one in the loop B. On each side of the lift well there is provided on each story in the positions denoted by 7 and 8 a jacking device which is countersunk into the ground, and which serves to raise the car leaving the lift, so that the plate 1 of the loop can be thrust under the car situated over the stand 7, and the plate 1 of the loop B under the car situated over the stand 8. The operation of the loops is similar to that in the form of construction shown in Fig. 1. 9 denotes stairways for the use of the driver, since the lift must reascend, in order to save time, immediately after the car has been transferred to the stand 7 or 8.

The multi-storied large scale garage (Figs. 6 and 7) with fully mechanical operation is disposed partly above and partly below the level of the ground. It contains on each story four juxtaposed loops of the type shown in Fig. 1 each of which has at each end a lift 11 (12) which is clearly indicated in the plan view by the insertion of diagonal lines in the appropriate rectangular figures. In front of the entrance to the lift wells, at the street level, there is a porch 13 into which the car is driven. Under at least one of these porches there are provided wash places and workshops which are accessible by means of the lifts. The lifts consist of cages 15 suspended on carrying cables 14. The driving mechanism for the lift is denoted by 16. For the service staff there are provided stairways 17.

Within each of the porches 13 on a level with the street approach, there is a U-shaped conveyer-plate 18 which is mounted so as to be slidable towards the lift, and on the bifurcated limbs of which the vehicle is driven with its wheels. This plate serves to bring the vehicle into position over the lift well, its axles being engaged from beneath by a block-shaped support pertaining to the cage. This support jacks up the vehicle by a slight upward movement of the lift, so that the slidable conveyor-plate can be pulled from under the wheels of the vehicle thus poised, after which the latter can then be raised or lowered by the lift to the selected story of the garage on which it is to be parked. For this purpose the plate constituting the parking stand is likewise bifurcated at its end. In view of the arrangement of two lifts the supporting plates or platforms 1 are bifurcated at both ends, so that in plan view they are in the shape of an H. The arrangement is such that the carrying support in the lift is of a breadth not exceeding that of the openings in the bifurcated platforms, so that relative movement as between the latter and the conveyor-plates and the stand plates is possible, both in a horizontal and in a vertical direction. In principle the elements for the transferring of the vehicle into the lift and from the latter on to the stands can also be conversely shaped, the vehicle being arranged to rest with its wheels on a bifurcated support in the lift, and with its axles on the conveyor-plate and on the stand platform.

The above-mentioned elements, which are indicated in Fig. 7, and their method of co-operation, will be more clearly understood with reference to Figs. 8 to 11, and 12 to 23, in which, for the sake of simplicity, it is assumed that the lift is not suspended from cables but is formed of a plunger.

In Figs. 8 and 9, 3 denotes the free space at the end of the loop track, and 11 the lift well in which there is vertically movable a narrow supporting base 19 which is mounted on a suitably telescoping tube 20. The platforms 1 which serve as stands, and which are guided on rails, are provided at their ends with pins 21 which can engage in claws 22 pertaining to driven endless belts. For each longitudinal limb of the loop track there is provided at least one such belt 23. For the transverse movement at the ends there are employed shorter endless belts 24 which in the present instance effect the conveyance of a carriage 25 on which there is mounted a further endless belt 26 running in the direction of the longitudinal axis of the loop track. This latter belt is used for the sliding-out of the platform 1, and is for this purpose likewise provided with claws which are so spaced that the two pins 21 of the outthrust plate can engage simultaneously in the claws of the belts 23 and 26. Connection is thereby established between these two belts for the purpose of the moving action. In Figs. 8 and 9 there is shown an intermediate position in which the supporting platform 1 projects to the extent of about one half over the lift well.

From the section shown in Fig. 10 it can be seen how the base portion 19 of the lift which supports the axles has room to pass between the forked side portions of the platform 1. The platform 1 has already been fully thrust out in lateral guides pertaining to the lift well, and the lift subsequently descends to deposit the vehicle with its wheels on the plate 1 (see Fig. 11).

The entire procedure of mechanically bringing a vehicle into the garage thus takes place in the manner already indicated and more fully to be described hereafter.

Figure 16:
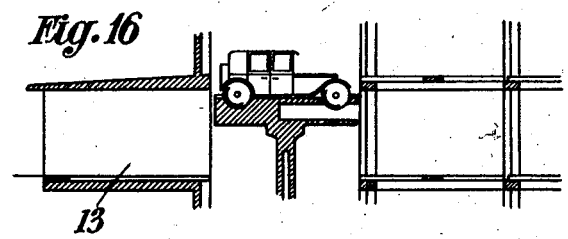
Figure 17:
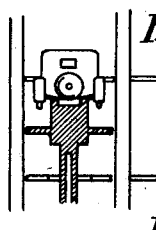
Figure 18:
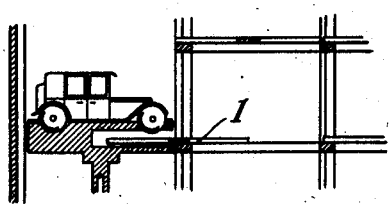
Figure 19:
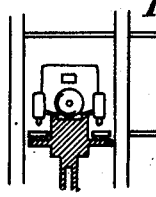
Figure 20:
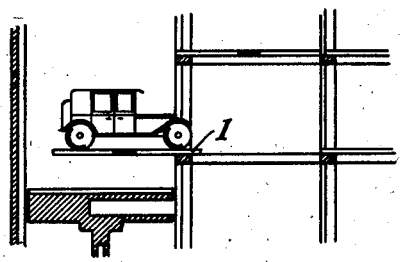
Figure 21:
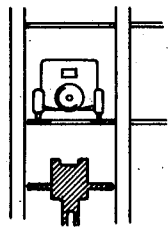
Figure 22:
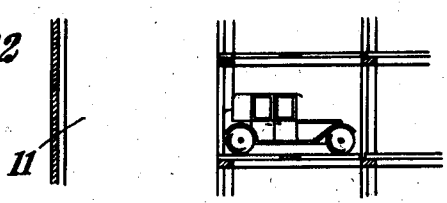
Figure 23:
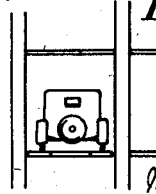

For this purpose a switching system can be employed which permits of the summoning to the lift well of the stand platform allotted to any particular car, from the entrance to the garage, as required. It is thus possible, by depression of a button at the entrance, to cause the blocked car with its engine stopped (see Figs. 12 and 13) to be thrust by means of the conveyor-plate 18 into the lift well (Figs. 14 and 15), whereupon the car is grasped beneath the axles by the supporting base 19 of the ascending lift and carried upwards, while the conveyor-plate 18 returns to its initial position (Figs. 16 and 17). As soon as the lift has reached the level of the desired story, the platform 1 is thrust forward into the lift well, its forked sides being thereby caused to embrace the supporting base 19 (Figs. 18 and 19). On slightly lowering the lift the car comes to stand upon the platform 1 (Figs. 20, 21) which at once conveys the same into its place on the loop track (Figs. 22, 23). When a car is to be conveyed from the stand to the outside or from the outside into a basement floor of the garage, the procedure is similar, only the car must be slightly raised for the withdrawal of the conveyor-plate 18 or of the platform 1 before transference into another story.

As will be seen from the above specification and from the accompanying drawings, the construction according to the present invention permits of full utilization of the building site, and provides a lay-out for close-storage garages which is adaptable in every respect to the space available. The novel loop track principle, in conjunction with the novel method of moving the carrying platforms, can be applied with equal success to large scale multi-storied garages, since the transference of the vehicles onto and from the lift platforms can be effected in a manner precisely similar to that adopted with the sliding platforms in single-story lay-outs. The simplicity thus achieved in the moving operations in its turn makes it possible for the entire working to be rendered automatic, with consequent saving in time and service. With mechanical operation, with which the car is blocked at the entrance to the garage and the engine stopped, there is also no danger from fire, and any independent movement of the car is ruled out. The possibility of using the garage solely as a parking place situated beneath the street level is a peculiar feature of the described novel type of construction which is calculated to satisfy a real and growing need.

We claim:—

1. In a storage garage, a series of platforms each adapted to support a vehicle, guiding and driving means for causing said platforms to travel in a closed horizontal loop-shaped path, and means for moving said platforms individually out of said loop-shaped path for receiving and discharging vehicles.

2. In a storage garage as described in claim 1, the combination of a lifting device adjacent said means for moving said platforms individually out of said loop-shaped path, said device being adapted to engage the vehicle from beneath to raise it so that the platform moved out of said loop-shaped path can pass under the wheels of the vehicle.

3. In a storage garage, a series of platforms each adapted to support a vehicle, guiding and driving means for causing said platforms to travel in a closed horizontal loop-shaped path, a lift adjacent said loop-shaped path, and means for moving said platforms individually out of said loop-shaped path and into the well of said lift.

4. A storage garage as claimed in claim 3, wherein said lift and said platforms comprise vehicle supporting means, one of which is bifurcated and adapted to support the wheels of a vehicle, and the other of which is sufficiently narrow to travel between the arms of the first and adapted to engage the axles of a vehicle.

JACQUES ROME.
KURT RUBINSTEIN.